C. P. STANBON.
SOLE ROUNDING MACHINE.
APPLICATION FILED NOV. 28, 1908.

958,024.

Patented May 17, 1910.
4 SHEETS—SHEET 1.

Witnesses.
Powell F. Hatch
Redfield Allen

Inventor,
Charles P. Stanbon.
By Bot P. Hains
Atty.

C. P. STANBON.
SOLE ROUNDING MACHINE
APPLICATION FILED NOV. 28, 1908.

958,024.

Patented May 17, 1910.
4 SHEETS—SHEET 2.

C. P. STANBON.
SOLE ROUNDING MACHINE.
APPLICATION FILED NOV. 28, 1908.

958,024.

Patented May 17, 1910.
4 SHEETS—SHEET 3.

C. P. STANBON.
SOLE ROUNDING MACHINE.
APPLICATION FILED NOV. 28, 1908.

958,024.

Patented May 17, 1910.
4 SHEETS—SHEET 4.

Witnesses:
Roswell F. Hatch.
Redfield H. Allen.

Inventor,
Charles P. Stanbon
By Robt. P. Hains Atty.

UNITED STATES PATENT OFFICE.

CHARLES P. STANBON, OF LYNN, MASSACHUSETTS, ASSIGNOR TO THOMAS G. PLANT, OF BOSTON, MASSACHUSETTS.

SOLE-ROUNDING MACHINE.

958,024.

Specification of Letters Patent.

Patented May 17, 1910.

Application filed November 28, 1908. Serial No. 464,816.

*To all whom it may concern:*

Be it known that I, CHARLES P. STANBON, a citizen of the United States, residing at Lynn, in the county of Essex and State of Massachusetts, have invented an Improvement in Sole-Rounding Machines, of which the following description, in connection with the accompanying drawings, is a specification, like characters on the drawings representing like parts.

The invention to be hereinafter described relates to sole rounding machines for operating upon sole blanks to bring the same to or approximately to the final form or shape desired in the completed boot or shoe, and more particularly to that type of such machine shown and described in patent to John J. Heys, No. 874,505, dated December 24, 1907.

The aims and objects of the present invention are to improve this general type of machine, to render it more effective in operation, convenient and safe to manipulate, and provide features whereby the resultant product is more perfectly formed, all of which will more clearly appear from the following description and accompanying drawings of one form of means embodying the invention, the true scope and character of which will be definitely pointed out in the claims.

The machine frame may be of any suitable character or design, that shown for illustrative purposes comprising a column 1 having goose-neck upper and lower portions 2 and 3, respectively, for supporting certain parts of the active machine elements.

Figure 3:
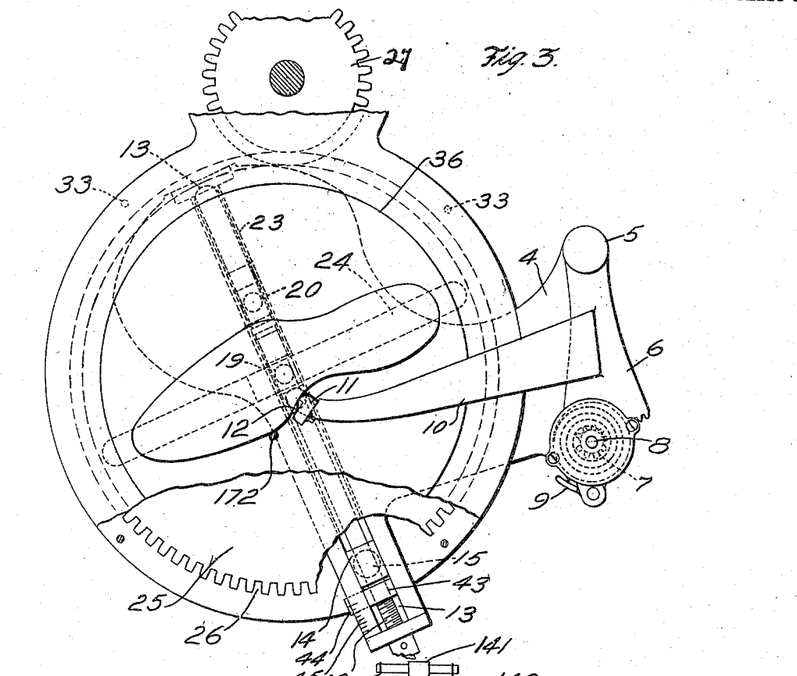
Fig. 3 is an enlarged section on the line 3—3, Fig. 1, some of the parts being broken away to show others beyond.

The upper surface of the rounding head B is formed to support the knife carrier head 4, Fig. 3, to the outer portion of which, at 5, is pivotally supported a segmental gear 6, the teeth of which engage the teeth 7 of a spring actuated shaft 8, a hand operated catch 9 serving to hold the shaft 8 against the action of its spring, substantially as pointed out in the patent hereinbefore mentioned. To the segment gear 6 is secured the knife carrying arm 10 having at its end a loosely mounted knife carrier 11, Figs. 3 and 9, supporting the cutting knife 12.

Figures 1, 2:
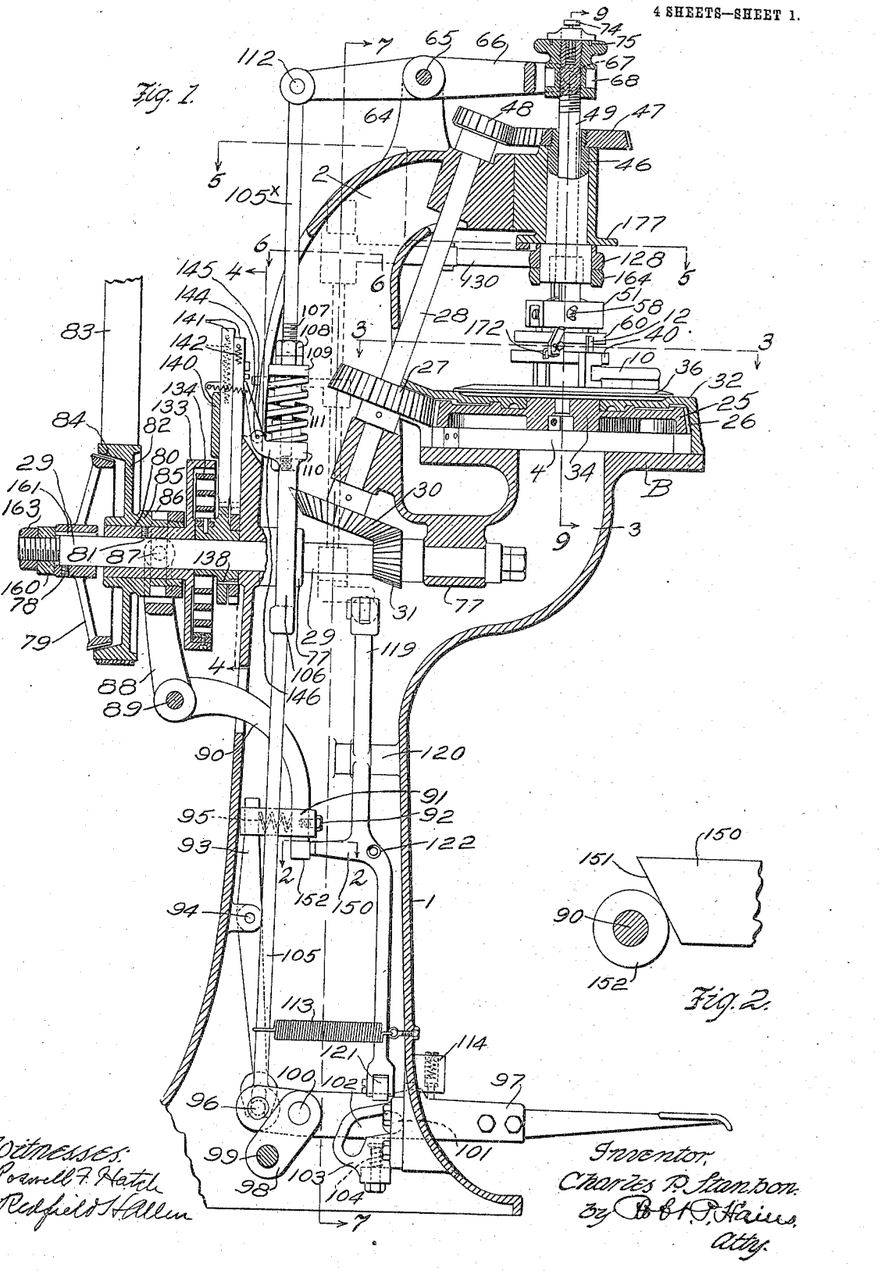
—Figure 1 is a vertical section taken centrally through the machine from front to rear showing the relative position of the parts when the machine is at rest.
Fig. 2 is an enlarged detail section on line 2—2, Fig. 1.
Figures 9, 10:
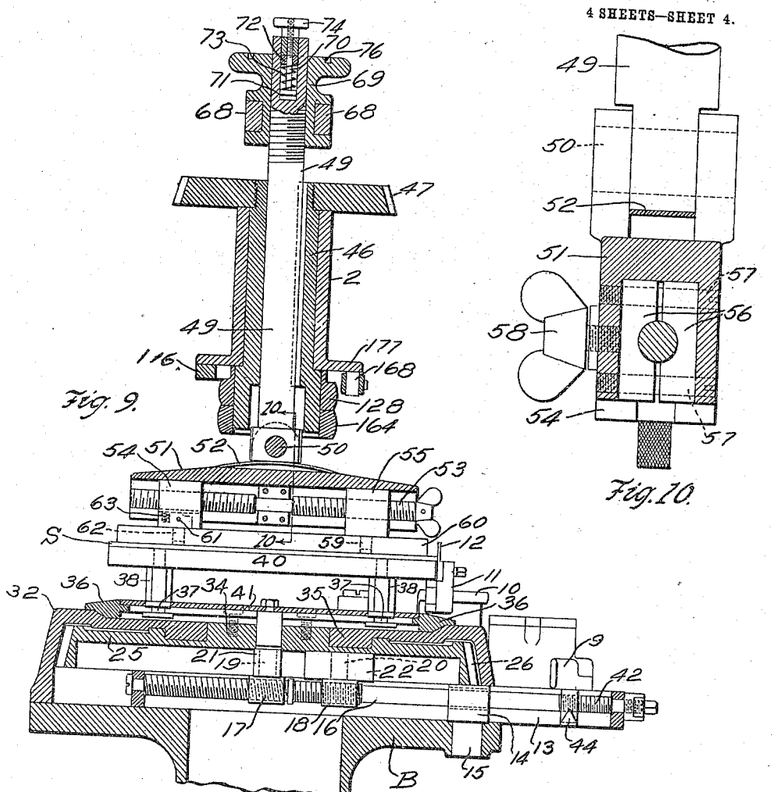
Fig. 9 is an enlarged vertical section centrally through the head portion of the machine on line 9—9, Fig. 1.
Fig. 10 is a sectional detail on line 10—10, Fig. 9.

The knife carrier head 4 is provided with a slot 13 engaged by a fulcrum block 14 carried by a pin 15, Figs. 3 and 9, secured to the rounding head B, and extending lengthwise of the said slot is the adjusting screw 16 having threaded portions preferably of differing characters which engage respectively with blocks 17 and 18, longitudinally movable in said slot and having pins 19 and 20 respectively which engage blocks 21, 22 movable in the cross slots 23, 24 of the rotatable head 25, Figs. 1, 3 and 9, in a manner substantially as set forth in the said patent. The head 25 is provided on its periphery with gear teeth 26, which engage corresponding teeth in the actuating gear 27 on shaft 28 which is driven from the main shaft 29 by connecting bevel gears 30 and 31, Fig. 1. Disposed above and about the rotatable head 25 is a cover plate 32 secured by suitable means, as bolts 33, Fig. 3, to the rounding head B. The head 25 has a central hub-like portion 34, Fig. 9, and the cover plate 32 has a complemental circular flanged portion 35, whereby the head 25 may through its described actuating means be given a rotary motion. Surmounting and secured to the hub-like portion of the rotary head 25 is a slotted plate 36 in which are adjustable the work supporting pins 37, 37 surrounded by the sleeves 38, 38, said pins 37, 37 being adapted to engage suitably spaced holes 39, 39 in a pattern 40 on which a sole blank S is to be placed.

Figure 12:
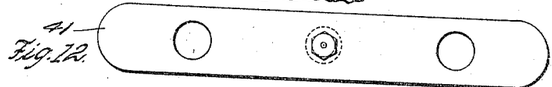
Fig. 12 is a detail of the locking plate.

The above parts and their operative characteristics may be substantially as set forth in the patent heretofore mentioned and to which reference may be had. In order to lock the pins 37, 37 in their adjusted relation, an elongated locking plate 41 having perforations for the passage of pins 37, 37 may be employed, a detail plan view of such locking plate being shown in Fig. 12, a different plate being employed for each adjustment of the pins 37, 37 to suit different size and style of pattern.

The adjusting screw 16 is preferably provided with a screw portion 42, Fig. 9, engaging a block 43 having a pointer 44, which by means of a scale 45 will indicate the adjustment of the block 17 and 18 for different size or style of work.

Mounted in the bearing of the upper goose-neck 2 is a sleeve 46 having secured thereto a gear 47 in operative engagement with the gear 48, Fig. 1, on the shaft 28, and splined to said sleeve is the spindle 49. Pivotally connected to the spindle 49 at its lower end, at 50, is the upper member 51 of the work clamp, a spring 52 serving to hold the clamp member 51 in substantially horizontal position, as indicated.

The clamp member 51 is slotted longitudinally and carries an adjusting screw 53 having right and left hand screw threads for engaging complemental screw threads in the supporting blocks 54, 55, a thumb nut serving to turn the screw 53. The screw 53 is centrally supported by a split bearing formed by the parts 56 held in the longitudinal slot of the member 51 by suitable means, as the pins 57, and a set screw 58 threaded into the wall of the member 51 and bearing on one of the parts 56 serving to clamp and hold the screw 53 in its adjusted position, Fig. 10.

Projecting from the block 55 is a clamp plate supporting pin 59 adapted to engage a suitable opening in the clamp plate 60, Fig. 9; and pivotally connected to the other block 54 at 61 is another clamp plate supporting pin 62, a spring 63 serving to turn the pin 62 toward the pin 59, as will be clear. In applying the clamp plate 60 to its clamp member, the pin 62 is first engaged by an opening in the clamp plate 60 and then pushed to the left, Fig. 9, whereupon the similar opening in the clamp plate near the opposite portion thereof will be in position to engage the pin 59, the tension of the spring 63 being sufficient to hold the clamp plate to its clamp member 51.

Obviously, either or both of the plates 40 and 60 which constitute the clamp for the work may be formed of suitable material and shape to constitute a pattern by which the knife 12 may be guided as it rounds the sole in the manner stated in said prior patent.

Fulcrumed in suitable supporting brackets 64, Fig. 1, of the machine frame at 65 is a clamp actuating lever 66 having pins 67 to enter suitable sockets 68, Fig. 9, in an adjustable lifting head 69 screw threaded to the spindle 49 as clearly indicated in Fig. 9. The spindle 49 at its upper portion is recessed, as shown, for the reception of a pin 70 having a head 71 between which and a screw block 72 there is interposed a spiral spring 73, the upper end of said pin 70 carrying a head 74 with a locking pin 75, Fig. 1, adapted to engage any of a series of perforations 76 in the lifting head 69. The head 74 engages a cross-notched portion in the top of the spindle 49, whereby when said head 74 is depressed by its actuating spring 73 relative rotation of the head 69 and spindle 49 is prevented, and when the head 74 is raised, such relative rotation is permitted to adjust the head 69 on the spindle 49, as will be obvious.

Mounted in suitable bearings 77 of the supporting frame is the driving shaft 29 suitably held from endwise movement in its bearings. Splined to the main shaft and further secured thereto by a locking pin or set screw 78 is a clutch member 79, to be hereinafter referred to as the fast clutch member. Suitably mounted on the main shaft is a sleeve 80, secured thereto as by pins 81, and slidably mounted longitudinally of the shaft on said sleeve 80 is the belt pulley 82 driven by a belt 83 from any suitable source of power and having an inclined face 84 constituting the other member of the clutch to be hereinafter referred to as the loose clutch member.

The hub extension 85 of the pulley 82 is provided with a circular recess 86 engaged by suitable pins or rollers 87 projecting from the yoke carrying arm 88 of a bell crank lever pivoted at 89 and having the downwardly extending arm 90, the construction being such that upon movement of the arm 90 in one direction (to the right, Fig. 1), the clutch member 84 will be moved into engagement with the fast clutch member and the main shaft 29 may be driven, and by movement of the arm 90 in the reverse direction, the clutch members will be disengaged with consequent disengagement of driving connection with the main shaft.

The arm 90 of the clutch actuating device has secured thereto near its lower end a slotted link 91, by means of a screw 92, or otherwise, and disposed between the end of said arm 90 and the upper end of a lever 93 pivoted at 94 is a spring 95. The lower end of the lever 93 is pivotally connected at 96 to the end of a treadle 97 supported from the main frame 1 by means of a link 98 pivoted to the main frame at 99 and to the treadle at 100. The treadle 97 has a pin 101 projecting from the side thereof and engaging a slot 102 in a bracket 103 secured to the main frame. Disposed in the bracket 103 below the treadle is a spring actuated plunger 104 which serves to raise the treadle when the latter is free to rise.

From the construction thus far described, it will be apparent that upon depression of the treadle 97 it will move rearwardly, being guided in such movement by the link 98 and the slot 102, and that such movement will turn the lever 93 so as to compress the spring 95 disposed between its upper end and the lower end of the arm 90 of the clutch actuator, and if said arm 90 is free to move, the clutch members will be engaged and the driving shaft be actuated, but should the arm 90 not be free to move, the spring 95 will simply be compressed.

Pivotally connected to the end of the treadle 97 is a clamp actuating rod 105, said rod being preferably formed in two parts, Fig. 1, such two-part construction, in the present form of the invention, comprising a yoke 106 secured to the upper portion of the rod 105 and straddling the driving shaft 29, the upper portion of the yoke being provided with an opening through which passes the end of the upper portion 105* of said rod, said upper portion being screw threaded at 107 and having suitable adjusting nuts 108 for the collar 109 between which and the upper portion 110 of the yoke 106 is disposed a spring 111, the construction being such that upon depression of the treadle, the rod 105 will be raised and if the upper portion 105* of said rod is free to move, it will likewise be raised and correspondingly operate the lever 66 to which it is attached at 112 to thereby lower the upper clamp plate onto the work, as will be readily understood from Fig. 1, further depression of the treadle serving, through the spring 111, to force the clamping members of the work clamp yieldingly together.

Figure 7:
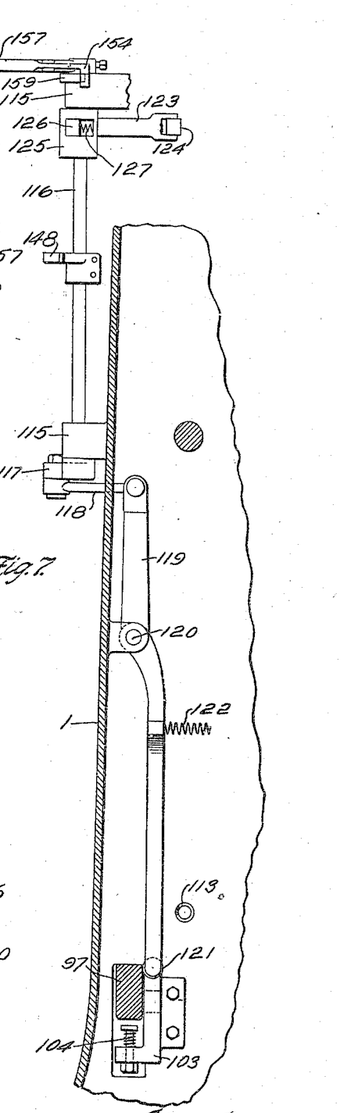
Fig. 7 is a vertical section on the line 7—7, Fig. 1.

Connecting the lower portion of the rod 105 to the main frame is a spring 113 which serves to throw the treadle 97 back into initial position when released, and a spring plunger 114 serves to cushion the treadle 97 as it returns to such position. Mounted in suitable bearings 115 on the machine frame, Fig. 7, is a stop rod 116 carrying at its lower end a crank arm 117 connected by a rod 118 with the upper end of a treadle locking lever 119 pivoted at 120 to the machine frame and carrying at its lower end a roller 121 which is adapted to be moved by a spring 122, acting on the lower arm of said treadle locking lever, to throw said roller 121, on the lower end of the locking lever 119, above the treadle 97, as clearly indicated in Fig. 7. When the treadle is in its raised position and the machine is at rest, the end of the treadle locking lever stands at one side of the treadle, as indicated in Fig. 7, but when the treadle is depressed, the lower end of said locking lever may move into position above the treadle, and thereby lock it in depressed position, even though the foot be removed from the treadle. Obviously, if the lower end of the locking lever be removed from its locking position with respect to the treadle, the latter will at once move back to its initial position under influence of its actuating springs.

Figures 6, 8:
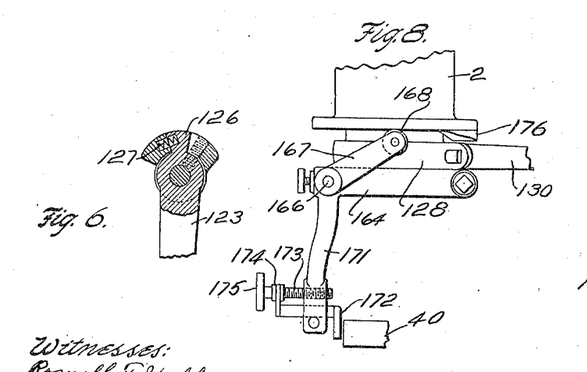
Fig. 6 is a sectional detail on the line 6—6, Fig. 1.
Fig. 8 is a detached view of the side gage.

In order that the treadle locking lever 119 may be controlled so as to permit the machine to be stopped automatically at the desired time, suitable provision is made to free the treadle at a determined period in the cycle of the machine operation, and with this object in view the upper end of the stop rod 116 is connected to an operating arm 123, the end of said arm being preferably provided with a roller 124. The arm 123 is connected to the stop rod 116 so as to have some movement independent of said rod, as indicated in Figs. 6 and 7, and to this end the stop rod 116 is provided with a slotted collar 125 into which a toe 126 connected to the arm 123 projects, said toe being normally acted upon by a spring 127, the construction being such that when the end 124 of the operating arm 123 is moved to turn the stop rod 116, it will first move independently of said rod, compressing the spring 127, and thereafter will move the stop rod, said movement of the operating arm and stop rod being automatically effected upon the completion of the rounding operation, as will now be described.

Figure 5:
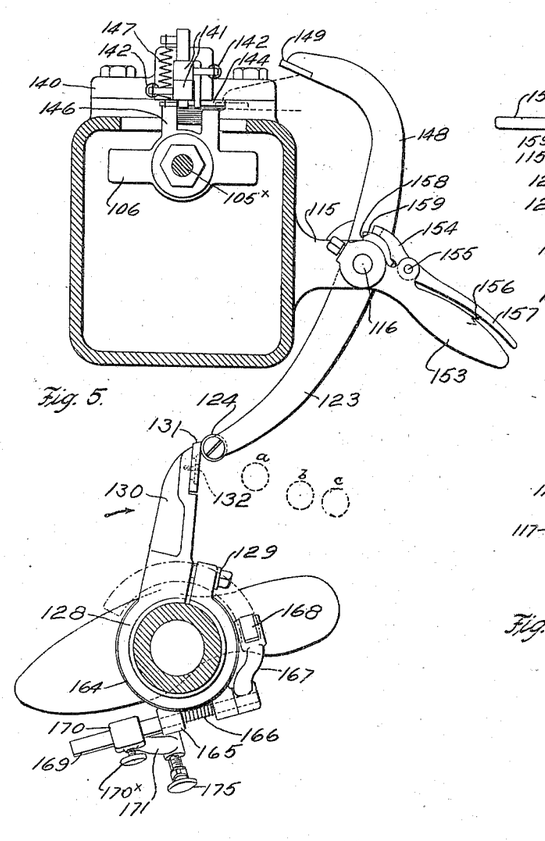
Fig. 5 is a section on the line 5—5, Fig. 1.

Secured to the lower portion of the rotating sleeve 46, Figs. 5 and 9, is a collar or carrying member 128, said collar being preferably clamped to the sleeve 46 by means of a set screw 129, Fig. 5. Projecting from the collar or carrying member 128 is a tripping arm 130 having an adjustable toe or outer portion 131 held thereto by an adjusting screw 132, said toe 131 being adapted to engage the roller 124 on the operating arm 123 as the rounding operation nears completion, as indicated in Fig. 5.

From the general character of the mechanism thus far described, it will be clear to one skilled in the art that the treadle 97 having been depressed, the clamp members having been brought together by the yielding pressure means, hereinbefore described, the driving shaft operatively connected to its operating means, and the lower end of the treadle locking lever 119 having taken position above the treadle 97 under the stress of its spring 122, the roller 124 of the operating arm 123 will have been placed in position, as indicated in Fig. 5, to be engaged by the toe 131 of the tripping arm 130, as said trip arm reaches the position indicated by Fig. 5 near the completion of the rounding operation, and that further movement of the trip arm 130 in the direction of the arrow, Fig. 5, will turn the operating arm 123 successively into the dotted line positions indicated in Fig. 5 to first compress the spring 127, then turn the stop rod 116, and free the treadle from the treadle locking lever 119, thus causing disengagement of the clutch members and ultimate stopping of the machine in the manner now to be described.

Figure 4:
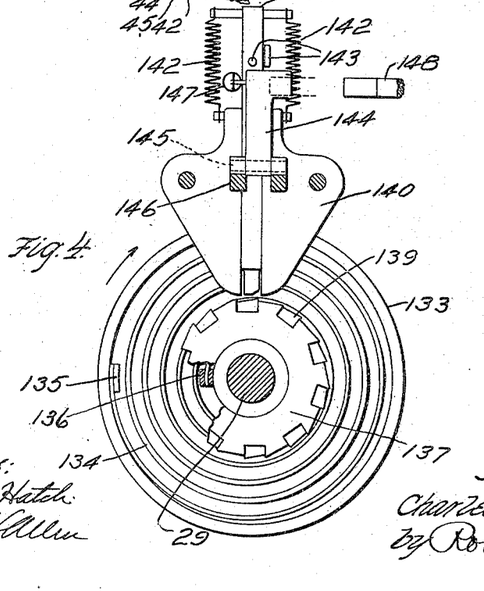
Fig. 4 is a sectional detail on line 4—4, Fig. 1.

In order that the machine may be run at high speed and yet the parts be brought to rest in a predetermined position for the commencement of the next cutting or rounding operation, it is desirable that the momentum of the machine be gradually overcome after the disengagement of the clutch members and then given a reverse movement, and to this end, the invention contemplates mechanisms substantially as follows:

As hereinbefore stated, the sleeve 80, Fig. 1, is fixed to the driving shaft 29 and it carries a reversing disk or wheel 133 to which one end of a spring 134, Fig. 4, is secured at 135, the other end of said spring being secured at 136 to a stop member 137 loosely mounted on the driving shaft 29, said member 137 being preferably formed, as indicated in Fig. 1, of two peripherally notched wheels or disks secured together by a pin 138, Fig. 1, and having a hub projecting into the reversing disk or wheel 133, the notches 139 in said members 137 being disposed so that a notch in one member is opposite a blank space in the other, as indicated in Fig. 4. Obviously, if the members 137 be held from rotative movement, while the reversing disk or wheel 133 continues to rotate with the main shaft 29, the spring 134 will be wound or tensioned and, if permitted, its tension will serve to reverse the movement of the main shaft and the knife and work clamps connected therewith. Mounted for vertical movement in a bracket 140, Fig. 1, are the stop fingers 141 to which springs 142 are connected and to the bracket 140, normally tending to depress said fingers.

The fingers 141 are each provided with a stop pin or projection 143 adapted to engage the upper end of a catch 144, Fig. 4, pivoted at 145 to a bracket 146 projecting from the yoke 106, a spring 147 normally acting to move the catch 144 under the projections 143, so that upon upward movement of the yoke 106, said trip catch will raise the fingers 141 against the tension of their springs 142.

Secured to the stop rod 116 is a catch trip 148, the end 149 of which is adapted to engage the catch 144 and push it from under the projections 143 on the fingers 141 when said stop rod 116 is moved in the manner hereinbefore described.

From the characteristics of the construction described, it will be clear, upon depression of the treadle 97 to start the machine, that the catch 144 will lift the fingers 141 and free their lower ends from the members 137, or either of them, and that upon completion of the rounding operation, the stop rod 116 will be turned to throw the catch trip 148 inward, Fig. 5, to disengage the catch 144 from the projections 143 upon the fingers and allow one or the other of said fingers to drop into engagement with its coöperating member 137 which thereupon is held from further rotation, the clutch members at such time having been disengaged, as will be understood. The momentum of the machine continues the moving parts in operation for a short time, thereby winding up the tensioning spring 134, which, after having overcome the momentum of the machine, gives the knife and work clamps and tripping arm 130 a reverse movement to bring the knife and clamp into predetermined relative positions. This reverse movement of the tripping arm 130 will make clear the purpose of mounting the operating arm 123 on the stop rod with a spring connection, as described, such spring connection serving to swing the operating arm back to a position such that, on reversal of the machine, it will not be struck by the tripping arm 130.

In the machine of the character described, it is desirable that the clutch members be not thrown into operative engagement until after the work clamping members have been moved into holding engagement with the work between them, and to this end, the treadle locking lever 119, see Fig. 1, is provided with a side projecting arm 150 having an inclined or cam face 151, see Figs. 1 and 2, which is in the path of a roller 152 carried on the lower end of the arm 90 of the clutch actuator. From this construction, it will be seen that notwithstanding the depression of the treadle 97 and the compression of the spring 95 by the lever 93, the arm 90 of the clutch actuator cannot move until the cam face of the side projecting arm 150 is moved from its path, such movement being permitted only after a complete depression of the treadle, as hereinbefore noted, and the consequent prior clamping action of the work clamping members. Similarly, on the stopping action of the machine, it is desirable that the clutch members be disengaged prior to the unclamping action of the work clamping members and to this end, as the operating arm 123 turns the stop rod 116, it moves the treadle locking lever sufficiently, prior to its disengagement with the treadle 97, to cause the cam surface 151 to move the arm 90 of the clutch actuator to disengage the clutch, and, thereafter, as the treadle locking lever is moved from engagement with the treadle, the operation of unclamping takes place, as will be readily understood.

It will be noted that a single treadle is employed to both clamp the work and thereafter start the machine. In such class of machines, it is frequently desirable that the operator manipulate the clamping members without starting the machine. To effect this, the stop rod 116, Fig. 5, has secured thereto, preferably at its upper end, a handle 153 which carries a catch 154 pivoted to the handle at 155, a spring 156 normally acting upon the projecting end 157 of the catch to throw its opposite end into engagement with the wall 158 of a lug 159 secured to the upper bearing bracket 115. When the hand operating lever 153 is turned to engage the catch 154 with a stationary lug 159, the stop rod 116 is prevented from rotation, so that the cam surface 151 of the projecting arm 150 on the treadle locking lever, is maintained in position to prevent movement of the arm 90 of the clutch actuator in a direction to engage the clutch members, the construction being such that even though the treadle 97 be depressed, when the catch 154 is engaged with the projection 159, as stated, the clutch members cannot be moved into operative engagement although by such depression of the treadle, the clamping members may be brought into clamping action with respect to the work.

When the machine is operated at relatively low speed, it is desirable that the disengagement of the clutching members shall take place later in the machine operation than when the machine is run at relatively high speed, for the reason that the momentum of the machine itself is depended upon for winding up the spring 134, and as said parts are to be brought to rest in the same relative position regardless of speed, the above desirable characteristic of the clutch operation will be apparent to those skilled in the art.

Any suitable means may be employed to adjust the relative position of the clutch members so that more or less movement of the loose member will be necessary according as the speed is greater or less. The means illustrated in the present form of the invention comprises a milled nut 160, Fig. 1, screw threaded to the end of the driving shaft 129 which nut bears upon the face of the fast clutch member 79, said member 79 having a splined connection 161 with the driving shaft and a set screw 78 to hold said fast clutch member in adjusted position on said shaft. A lock nut 163 may be employed to hold the milled nut 160, as will be understood.

Obviously, the same characteristic early or later action of the clutch members might be effected by proper relative positioning of the roll 152 and its co-acting cam surface 151, Fig. 2.

It will be noted that the sole blank is clamped between two clamping members which rotate, that one or both of said clamping members may be a pattern, and that the knife is normally pressed toward the pattern, which thereby guides the same during its cutting action, such action resulting from a combined movement of the clamping members and knife, as pointed out in the patent mentioned. It is desirable that the sole blank be positioned with respect to the clamping members and particularly with respect to the pattern prior to the commencement of the cutting operation.

In the present form of the invention the knife is normally held pressed against or substantially against the edge of the pattern and serves as one positioning point, and, to provide the other, there is clamped to the sleeve 46, below the collar 128, a second collar 164, Figs. 1, 5, 8 and 9, provided with suitable bearings 165, Fig. 5, for a gage carrying shaft 166 to which is secured the arm 167 having a roller 168. The shaft 166 has a squared portion 169, Fig. 5, on which is adjustably mounted a collar 170 adapted to be clamped to the shaft by a set screw or other suitable means 170*. Depending from the collar 170 is a gage carrying arm 171 in the lower end of which is slidably mounted the edge gage 172, Fig. 8, said edge gage is connected to an adjusting screw 173 by a collar 174, said adjusting screw being threaded into the arm 171, the construction being such that upon manipulation of the screw 173 by its hand wheel 175, the gage 172 may be moved relative to the arm 171 to bring the gage 172 in desired position with respect to the edge of the pattern.

Figure 11:
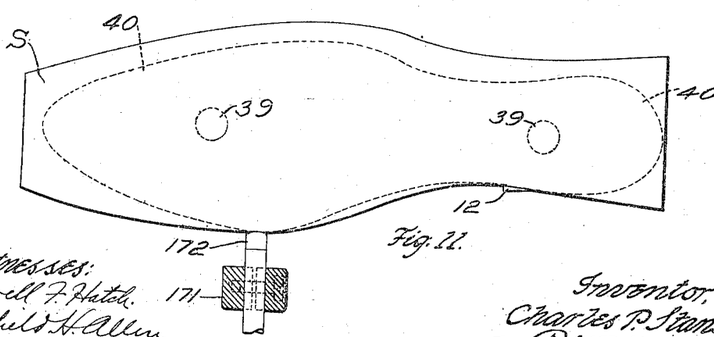
Fig. 11 is a plan view showing the sole on the pattern with the gage and knife co-acting to determine the position of the sole.

By reference to Fig. 11, which shows the relative positions of the pattern or clamp, the sole-blank, and knife, at the commencement of the rounding operation, it will be seen that the knife itself acts as one positioning point for sole-blank near the heel portion thereof and that the gage 172, acting nearer the toe portion of the sole-blank, serves as the other positioning point. It will be understood, however, that while the knife has movement relative to the work clamping members to increase or decrease the speed of cutting at different portions of the sole blank, as pointed out in the patent heretofore mentioned, the work clamping members and their connected parts including the edge gage move in a circular path, so that the said gage at one time in its circular movement passes the knife. Means are therefore provided to move the gage so that it will not meet the knife, such means in the present form of the invention comprising a cam surface 176 formed on the under surface of the flange 177 extending from the frame 2, said roll being so disposed that as the gage travels around with the work clamps and approaches the knife 12, the roller 168 rides over the cam surface 176 and lifts the gage or turns it in a manner to clear the knife, as will be readily understood.

From the construction described as one means for practically carrying the invention into effect, it will be seen that upon manipulation of the treadle or other unitary device, the work clamping members will be given relative movement to clamp the work between them, said work having been properly and readily positioned by means of the knife and gage, as described, and that the means for operating the clutch actuator will be moved. Prior to complete or substantially complete manipulation of the treadle or other unitary device, however, the clutch actuator is locked from movement, so that the main shaft is not connected to its operating means until a time subsequent to the action of the clamping members. As the work clamp operating means is thus moved, it raises the stop fingers, and upon full manipulation of the treadle or other unitary operating device, the locking means, such as the lever 119, swings with its locking end into locking relation with the treadle, thus freeing the clutch actuator from its controlling element, such as the cam projection 150, and permitting the main shaft to be driven from the source of power. Such movement of the locking means or lever 119 causes the stop rod and its operating arm to be turned to place it and its connected parts substantially in position as indicated in Fig. 5.

As the work clamping members and cutter operate to round the sole, the tripping arm 130 and gage 172 rotate with the upper clamping member, the gage 172 as it moves past the knife being held from engagement therewith by its arm and roll acting on the cam 176. When the tripping arm 130 meets the end of the operating arm 123 as the rounding operation nears completion, it turns the arm 123, moving the end into the dotted line position *a*, Fig. 5, thereby compressing the spring 127 between the stop rod and arm 123. Further movement of arm 123, to dotted line position *b*, Fig. 5, turns the stop rod 116 sufficiently to move the lever 119 and cause the clutch controlling element, as the cam projection 150, to move the clutch actuator and disengage the clutch members, the catch trip at such time or immediately thereafter striking the catch 144 and disengaging it from the stop fingers 141, 141, which thereupon drop, the one or the other, into engagement with a notch in the stop member 137, thereby stopping the end 136 of the spring 134 from movement with the main shaft. The treadle assumes its initial position and the momentum of the machine carries the work clamping members and tripping arm 130 still farther, winding up the spring 134 until the operating arm 123 reaches a position substantially as indicated by the dotted lines *c*, Fig. 5, whereupon the arm 123 escapes from the tripping arm 130 and by virtue of its spring connection with the stop rod 116 moves in the reverse direction so as not to be in the path of the tripping arm 130 as said arm is reversed with the clamping members and cutter by the spring 134.

It is important where a unitary device, such as a treadle, is employed to move the clamping members into clamping relation and also start the machine, that there be some provision to permit the said unitary device to manipulate the clamping members without at the same time starting the machine, and the present invention while showing and describing a particular means, which is convenient and readily controlled to this end, is comprehensive in this and other respects, as defined in the claims, it being obvious that those skilled in the art may devise various mechanical devices to carry the invention into practical effect.

What is claimed is:

1. In a sole rounding machine, the combination of upper and lower work clamping members, a knife carrier and knife, power means connected to the upper and the lower clamping members to positively rotate each of them in unison and impart cutting movement to said knife, and means operative after the said power means is disengaged from its driving connection with the upper and lower clamping members and knife to reverse the movement of the said upper and lower clamping members and knife and return them to initial or starting position.

2. In a sole rounding machine, the combination of upper and lower work clamping members, a knife carrier and knife, power means connected to the upper and lower clamping members to rotate them in unison and impart cutting movement to said knife, a spring, and means connected to the spring and operative after the said power means is disengaged from its driving connection with the upper and lower clamping members and knife to reverse the movement of the said upper and lower clamping members and knife and return them to initial or starting position.

3. In a sole rounding machine, the combination of a work support to sustain a sole to be rounded, a knife to act on the sole, means to move the work to present it to the knife, means to also impart cutting movement to the knife in a direction opposite that in which the sole is moved, and means for automatically reversing the movement of both the work support and the knife and return each to initial position after the actuating means for the work support has been disengaged from driving connection with said work support.

4. In a sole rounding machine, the combination of work clamping means to clamp and hold the work, cutting means, mechanism to rotate the work clamping means and to move the cutting means bodily for cutting the work, and unitary controlling devices to disengage the said mechanism from operative connection with the work clamping and cutting means, for reversing the direction of movement of the work clamping and cutting means, and unclamping the work.

5. A sole rounding machine comprising, in combination, clamping means arranged to clamp a sole blank, means to rotate the clamping means and sole blank, a cutter, means to move the cutter along the clamping means to contribute to the cutting action, and means to move the cutter and the work clamping means in the opposite direction as the machine is brought to rest.

6. A sole rounding machine comprising, in combination, cutting means, work supporting and controlling means, operating means to move the work and to impart cutting movement to the cutting means to cause a resultant relative sole cutting movement, means to disengage the said operating means from operative engagement with the work supporting and cutting means when the cutting means and work assume a predetermined relation, and means to reverse the movement of both the work supporting and cutting means and move them in the opposite direction as the machine is brought to rest.

7. In a sole rounding machine, the combination of an upper and a lower clamping member, means to move one member toward and from the other, a cutter to act upon a sole held by the clamping members, starting means for the machine, a treadle, connections between the treadle and the starting means and movable work clamping member, and means to render the treadle ineffectual for starting the machine when it is desired to move the movable clamping member with the machine at rest.

8. In a sole rounding machine, the combination of a rotary work support, an elliptically moving knife having variable speeds, means for operating both the support and knife and to cause the knife to cut beyond its starting or initial position with respect to the work support, and means for moving of both the work support and knife in the opposite direction to return them to initial position.

9. In a sole rounding machine, the combination of a rotary work support and a knife, means for operating said work support and knife to round a sole controlled by the work support, clutch mechanism for connecting and disconnecting said means with and from a source of power, and a spring which is wound up and put under tension by the momentum of the machine after the said means has been disconnected from the source of power and acting to reverse the movement of both the work support and knife and return each to its initial position.

10. In a sole rounding machine, the combination of work clamping members, a cutter, means for relatively moving said parts to round a sole held by the clamping members, clutch mechanism for connecting and disconnecting the said means with and from a source of power, a spring put under tension by the momentum of the machine after the said means has been disconnected from the source of power and acting to reverse the relative movement of the clamping members and cutter, and a controlling means operating on substantial completion of the rounding action to operate the clutch, cause the spring to be wound up and to act as stated, and to finally unclamp the work from the clamping members.

11. In a sole rounding machine, the combination of work clamping members, a cutter for cutting a sole held by the clamping members, a shaft for operating each of the work clamping members and cutter relatively, clutch mechanism comprising fast and loose clutch members for driving said shaft, a spring having one end connected to said shaft and its other end free relative to said shaft, and means for causing the clutch members to be disengaged and the free end of the spring to be then held so that the momentum of the machine will put the spring under tension, which, when the momentum is overcome, will return the clamping members and cutter to initial or starting position.

12. In a sole rounding machine, the combination of work clamping members, a cutter for cutting a sole held by the clamping members, a shaft for operating the clamping members and cutter relatively, means for connecting and disconnecting said shaft with and from a source of power, a spring, and means adapted to be connected with and to hold one end of the spring and cause the machine momentum to place the spring under tension when the shaft is disconnected from its driving power and to reverse the movement of the clamping members and cutter to return them to initial position.

13. In a sole rounding machine, work clamping members, a cutter for acting upon the work held by the clamping members, starting means for the machine, a unitary device for relatively moving the clamping members to cause them to clamp the work and to start the machine, and means for rendering said unitary device ineffectual to start the machine while permitting it to impart relative movement to the clamping members.

14. In a sole rounding machine, work clamping members, a cutter for acting upon the work held by the clamping members, starting means for the machine, a treadle and connecting devices for relatively moving the clamping members to cause them to clamp the work and to start the machine, and means for rendering said treadle ineffectual to start the machine while permitting it to impart relative movement to the clamping members.

15. In a sole rounding machine, work clamping members, a cutter for acting upon the work held by the clamping members, a shaft, clutch mechanism for connecting the shaft to a source of power, a unitary device for relatively moving the clamping members to cause them to clamp the work and to operate the clutch mechanism, and means under control of the operative for rendering the unitary device ineffectual with respect to the clutch mechanism when it is desired to relatively move the clamping members with the machine at rest.

16. In a sole rounding machine, the combination of a movable work clamping member, a cutter, operating means to cause the cutter to act upon the sole to round the same, a unitary device for starting said means into action and for moving the clamping member with respect to the work, and means for rendering the said unitary device ineffectual with respect to the said operating means while permitting it to impart movement of the clamping member toward the work.

17. In a sole rounding machine, the combination of a rotary work support comprising upper and lower clamping members, an elliptically moving knife, means for so operating each of said clamping members and knife and to cause the knife to cut beyond its starting or initial position with respect to the clamping members, and means for reversing the movement of the work support and knife to return them to initial position, and means to then separate the clamping members.

18. A sole rounding machine, comprising, in combination, work clamping members, a cutter, means for operating said parts, a unitary device for moving the clamping members relatively to clamp the work between them and for connecting said means with a source of power, automatic means for disconnecting said first mentioned means from said source of power, and means acting automatically to reverse the movement of said first mentioned means and unclamp the work.

19. A sole rounding machine comprising, in combination, work clamping members, a cutter, a shaft for operating said parts to round a shoe sole, a treadle, connections therewith for moving the clamping members toward each other to clamp the work and for operatively connecting said shaft with a source of power, a lock for maintaining the shaft disconnected from the source of power until the clamping members have clamped the work, and means operative upon the completion of treadle operation to trip said lock and permit the said shaft to be operatively connected with the source of power.

20. A sole rounding machine comprising, in combination, a shaft, a clutch for connecting and disconnecting said shaft with a source of power, work clamping means and a cutter operating in connection therewith to round a shoe sole, a treadle for moving the work clamping means into work clamping position and for operating the clutch, a treadle locking lever, means controlled by said lever to prevent operation of the clutch, and means for operating said lever to free the clutch to the operation of its actuating means after the clamping means has clamped the work.

21. In a sole rounding machine, the combination of a shaft, a clutch for connecting and disconnecting the shaft with a source of power, work clamping means, a treadle for operating the clutch and work clamping means, a treadle locking lever, a cam projection on said locking lever to prevent treadle operation of the clutch until said lever is moved, and means to move said treadle locking lever to permit operation of the clutch actuating means after the treadle has operated the work clamping means.

22. In a sole rounding machine, the combination of a shaft, a clutch and its operating means for connecting and disconnecting said shaft with a source of power, work clamping means, a treadle, a treadle locking lever having a projection to control the action of the clutch operating means, and means operated by rotation of the work clamping means to move the projection of said treadle locking lever to disengage the clutch and then complete the movement of the treadle locking lever to free the work from the clamping means.

23. In a sole rounding machine, the combination of work clamping means and a coöperating cutter, a shaft, a clutch for connecting and disconnecting the shaft with a source of power, a clutch actuator, a spring for moving the clutch actuator, a treadle for moving the work clamping means into work clamping position and for putting said spring under tension, and means for locking and preventing operative movement of the clutch actuator in response to said spring until after the clamping means has clamped the work.

24. In a sole rounding machine, the combination of work clamping members one of which is movable toward and from the other, a shaft for rotating said work clamping members in rounding a shoe sole, a clutch for connecting and disconnecting the shaft with a source of power, a clutch actuator, a treadle for moving the work clamping members relatively to clamp the work and to subject the clutch actuator to an operating force, and means to lock the clutch actuator from movement responsive to said force while permitting the treadle to be actuated to move the clutch members.

25. In a sole rounding machine, sole rounding means including work clamping members, a shaft for operating the sole rounding means in rounding a shoe sole, means for connecting the shaft to a source of power, a unitary device for moving the work clamping members into work clamping position and for causing the shaft to be connected to its source of power, a controlling member to determine the conditions under which the shaft may be connected to its source of power, and means for locking the controlling member to prevent connection of the shaft with the source of power while permitting the unitary device to remain operative to move the work clamping members into and out of work clamping position.

26. In a sole rounding machine, the combination of sole rounding means including work clamping members, a shaft for operating the sole rounding means, a unitary device to control the movement of the work clamping members into work clamping position and the operation of said shaft, a locking device to maintain the unitary means in position with the work clamped between the work clamping members and the shaft in operation, a stop rod connected to said locking device to trip the same, and means to lock the stop rod in its tripping position.

27. In a sole rounding machine, the combination of sole rounding means including work clamping members, a shaft for operating the sole rounding means, a unitary device to control the movement of the work clamping members into work clamping position and the operation of said shaft, a locking device to maintain the unitary means in position with the work clamped between the work clamping members and the shaft in operation, a stop rod connected to said locking device to trip the same, an operating arm yieldingly connected to the stop rod, and a tripping arm to move the operating arm.

28. In a sole rounding machine, the combination of work clamping members, a cutter, and means to operate said parts in rounding a shoe sole, a tripping arm secured to and movable with the upper of said work clamping members, an operating arm, means to which said operating arm is yieldingly connected for stopping the rounding operation, and means to reverse the movement of the clamping members and said tripping arm.

29. In a sole rounding machine, the combination of upper and lower work clamping members and a cutter, means to operate both of said clamping members and cutter in prescribed paths in rounding a shoe sole, a tripping arm connected to the upper work clamping member having an adjustable toe, an operating arm adapted to be moved by the tripping arm as the upper work clamping member nears completion of the rounding operation, and means operated by the operating arm to stop the machine.

30. In a sole rounding machine, the combination of upper and lower work clamping members and a cutter, means for operating both of said clamping members and cutter in prescribed paths in rounding a shoe sole, a tripping arm, means for adjustably connecting the tripping arm to the upper clamping member, an operating arm with respect to which the tripping arm may be adjusted, and means connected therewith for stopping the machine.

31. A sole rounding machine comprising, in combination, work clamping members and a cutter, a shaft for operating said parts in rounding a shoe sole, power means for operating said shaft at varying speeds, means for disengaging the power means from said shaft, means operative after the power means is disengaged from the shaft to reverse the movement of the sole rounding devices, and means for varying the time of disengagement of the power means from said shaft in conformity with the speed of the rounding operation to cause the machine to stop with the parts in desired relation.

32. In a sole rounding machine, the combination of a rotary work supporting head, a knife carrier and knife, power means to rotate the work supporting head and impart cutting movement to said knife with relation to the head at varying speeds, means operative after the said power means is disengaged from its driving connection with the head and knife to reverse the movement of the said head and knife and return them to initial or starting position, and means for varying the time of disengagement of the power means from said shaft in conformity with the speed of the rounding operation to cause the machine to stop with the parts in desired relation.

33. In a sole rounding machine, the combination of a rotary work supporting head, a knife carrier and knife coöperating therewith to round a shoe sole, a shaft, power means for operating said shaft at different speeds, a spring, means for putting said spring under tension by the momentum of the machine after said shaft has been disconnected from the source of power to reverse the machine, and means to regulate the degree of spring tension due to machine momentum at different speeds to cause a uniform reverse movement.

34. In a sole rounding machine, the combination of a rotary work supporting head and cutter, an operating shaft, means for connecting and disconnecting said shaft with a source of power, a spring surrounding said shaft and having one end fixed with relation thereto, a stop member loose on said shaft and to which the other end of the spring is connected, means for holding the stop member in fixed position after the shaft has been disconnected from the source of power to wind up the spring and cause reverse movement of the shaft, and devices acting on completion of the rounding operation to cause said means to act.

35. In a sole rounding machine, the combination of work clamping members and a cutter in operative relation therewith, a shaft, clutch means for connecting and disconnecting said shaft with a source of power, means for moving the clamping members relatively to clamp the work and to connect the shaft with the driving power, a reversing member fast to the shaft and a stop member loose on the shaft, a spring connecting said members, stop fingers for holding the stop member from rotation, and means controlled by movement of the clamping members to free the stop fingers.

36. In a sole rounding machine, the combination of work clamping members and a cutter coöperating therewith, a shaft, means for operatively connecting and disconnecting said shaft with a source of power, a spring connected to said shaft, means for holding one end of said spring fixed with relation to the machine frame, and means for freeing said spring on starting the rounding operation.

37. In a sole rounding machine, the combination of work clamping members and a cutter coöperating therewith, a shaft, means for operatively connecting and disconnecting said shaft with a source of power, a spring connected to said shaft, means for holding one end of said spring fixed with relation to the machine frame, and means controlled by movement of the work clamping members in clamping the work for freeing said spring on starting the rounding operation.

38. In a sole rounding machine, upper and lower clamping members, a knife in operative relation therewith, means for rotating said work clamping members to effect the sole rounding operation, a gage connected to rotate with the work clamping members, and means for moving the gage outward to avoid contact with the knife.

39. In a sole rounding machine, the combination of work clamping members and a knife operatively related therewith, a gage disposed to contact with a clamping member at a point remote from the knife when the parts are in initial position to serve with said knife as a work positioning means, and means for moving the gage outward from the clamping member to avoid contact with the knife as said member and knife are relatively moved.

40. In a sole rounding machine, upper and lower clamping members, a rotating support for the upper member, a gage connected to rotate with the upper clamping member, a knife for cutting the sole, said gage and knife being disposed to bear against a clamping member at separated points to enable a sole to be properly positioned between the clamping members, and a cam for moving the gage outward to avoid contact with the knife during the rounding operation.

41. In a sole rounding machine, the combination of a spindle, means for rotating said spindle, a work clamping member pivotally connected to said spindle, and a spring for normally maintaining the work clamping member substantially at right angles with said spindle.

42. In a sole rounding machine, the combination of a spindle, means for rotating it, a work clamping member pivotally connected to said spindle and carrying clamp plate engaging pins, and a spring for maintaining the clamping member in plate receiving position.

43. In a sole rounding machine, the combination of a spindle, means for rotating it, a work clamping member carried by said spindle and provided with adjustable pin carrying blocks, means for adjusting said blocks toward and from each other, and a spring for holding the work clamping member in plate receiving position.

44. In a sole rounding machine, the combination of a plate 36, pins 37 adjustable therein toward and from each other, and a locking plate 41 having pin holding means to engage said pins and hold them in adjusted position.

45. In a sole rounding machine, the combination of a spindle, a work clamping member 51 flexibly connected to said spindle and provided with adjustable blocks 54 and 55, clamp plate engaging pins 59 and 62 carried by said blocks, one of said pins being fixed and the other yieldingly mounted, and a screw for adjusting said blocks toward and from each other.

46. In a sole rounding machine, the combination of a spindle, a work clamping member 51 carried thereby, clamp plate engaging pins 59 and 62 carried by said clamping member, a screw for adjusting said pins toward and from each other, and means for locking and holding the pins in adjusted position.

47. In a sole rounding machine, the combination of a shaft, a clutch for connecting and disconnecting said shaft with a source of power, work clamping means and a coöperating knife, a treadle, a spring for throwing the clutch into operation, a treadle locking lever having a cam for holding the clutch out of operation, connections between the treadle and work clamping means, and means to move the treadle locking lever and permit operation of the clutch spring after the treadle has been depressed to clamp the work.

48. In a sole rounding machine, the combination of a rotary work supporting head and a knife, a shaft for operating said parts, means for connecting and disconnecting the shaft and a source of power, a spring having one end connected to the shaft, stop members loose with respect to the shaft and to which the other end of the spring is connected, stop fingers to engage said stop member, and means operative on the conclusion of the rounding operation to cause a stop finger to engage a stop member.

49. In a sole rounding machine, the combination of a shaft, fast and loose clutch members thereon, work clamping members, a treadle and connection between it and the clutch members to cause said members to engage when the treadle is depressed, devices connecting the treadle and work clamping members, means for reversing the said shaft at the conclusion of the rounding operation, and means held normally inoperative by said connecting devices but freed from control thereof at the conclusion of the rounding operation to cause the reversing means to act.

In testimony whereof, I have signed my name to this specification, in the presence of two subscribing witnesses.

CHARLES P. STANBON.

Witnesses:
ROSWELL F. HATCH,
REDFIELD H. ALLEN.